United States Patent
Yagishita

(10) Patent No.: US 7,773,255 B2
(45) Date of Patent: Aug. 10, 2010

(54) APPARATUS AND METHOD FOR DETECTING DOCUMENT TAMPERING

(75) Inventor: Takahiro Yagishita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 944 days.

(21) Appl. No.: 11/524,873

(22) Filed: Sep. 22, 2006

(65) Prior Publication Data

US 2007/0071283 A1    Mar. 29, 2007

(30) Foreign Application Priority Data

Sep. 27, 2005 (JP) .............................. 2005-279277
Jul. 24, 2006 (JP) .............................. 2006-200161

(51) Int. Cl.
H04N 1/60 (2006.01)
H04N 1/40 (2006.01)

(52) U.S. Cl. ...................................... 358/1.9; 358/3.28

(58) Field of Classification Search .............. 358/3.268, 358/1.1, 1.9, 2.1, 3.01, 3.02, 3.03, 3.06, 3.09, 358/3.1, 3.28, 1.13, 1.14, 1.15, 1.18, 534, 358/536, 3.24, 437, 468; 283/72; 340/5.86; 356/71; 382/100, 135, 137, 312, 318; 705/50, 705/57, 62; 380/243, 55

See application file for complete search history.

(56) References Cited

U.S. PATENT DOCUMENTS

| | | | | | |
|---|---|---|---|---|---|
| 5,668,897 | A | * | 9/1997 | Stolfo | 382/283 |
| 5,917,931 | A | * | 6/1999 | Kunkler | 382/137 |
| 2004/0131265 | A1 | | 7/2004 | Yagishita et al. | |
| 2004/0208339 | A1 | | 10/2004 | Abe et al. | |
| 2004/0218799 | A1 | * | 11/2004 | Mastie et al. | 382/137 |

FOREIGN PATENT DOCUMENTS

| | | | |
|---|---|---|---|
| JP | 2733458 | B2 | 12/1997 |
| JP | 11-39468 | A | 2/1999 |
| JP | 11-41450 | A | 2/1999 |

* cited by examiner

Primary Examiner—Dov Popovici
(74) Attorney, Agent, or Firm—Dickstein Shapiro LLP

(57) ABSTRACT

For detecting tampering made on a paper document, by carrying out image processing on grayscale image data optically read from the paper document, amplifying a predetermined grayscale value on the grayscale image data, and also, reducing the other grayscale values; and detecting whether or not the paper document has been tampered, according to grayscale converted data calculated based on first grayscale image data obtained from reading an obverse side of the paper document and second grayscale image data obtained from reading a reverse side of the paper document.

20 Claims, 12 Drawing Sheets

APPARATUS AND METHOD FOR DETECTING DOCUMENT TAMPERING

BACKGROUND OF THE INVENTION

1. Field of the Invention

The present invention relates to an image processing apparatus and an image processing method, and, in detail, to image processing technology for detecting tampering made to an original document.

2. Description of the Related Art

Along with enforcement of the Electronic Document Law, established in Japan, November, 2004, it is expected that occasions of storing paper documents in a form of electronic data will increase accordingly. According to the Electronic Document Law, it is allowed to store a document, which ought to be stored, in a form of electronic data. According to the law, image data, obtained from being read from a paper document by means of a scanner or such, is regarded as an original document when specific requirements are met. As a result, it is expected that the costs required for printing, circulating and storing documents, business forms, and so forth, required for proceeding with business, will be remarkably reduced, and thus, computerization of inter-enterprise business transaction will be further promoted.

From the establishment of the Electronic Document Law, the costs required for storing and managing paper documents are reduced as a result of the paper documents being read by a reading apparatus, thus corresponding electronic data being obtained for being stored, and the original paper document being discarded. However, at the same time, a danger of being subject to tampering increases accordingly. There may be a case where a paper document before being read by a reading apparatus is tampered with, or, another case where tampering is made on electronic data obtained as a result of a paper document being read by a reading apparatus. For the latter case of tampering, the danger may be eliminated with the use of a time stamp system employing enciphering technology. Specifically, tampering can be detected as a result of signature data, which can be created only from a secrete key, being verified. For the former case of tampering, detection thereof is easy when the paper document is such that some physical trace is necessarily left when tampering is made. However, from electronic data which is obtained from being simply scanned by means of the reading apparatus, such trace may not be easily detected. Since the original paper document is discarded after being read by the reading apparatus as mentioned above, tampering should be detected only from the corresponding electronic data. Technologies have been proposed to detect tampering from electronic data.

For example, according to Japanese Laid-open Patent Application No. 11-039468 (referred to as a patent document 1, hereinafter), electronic data is obtained as a result of light, which transmits through a paper document, being read in a condition in which the light is applied from the reverse side of the paper document. A part of the paper document, for which a paper piece is attached to the obverse side thereof (i.e., cutting and attaching tampering), or tampering with the use of correcting fluid, has its transmittance reduced accordingly, and thus, the tampered part has darker image data, and thus, the tampering can be easily detected from the electronic data.

As anther related art, a technology called 'digital watermarking' exists. According to this technology, other information (message authentication code) is obtained from information (message), and is printed out on a paper document, according to a predetermined rule. And, the message authentication code is printed out as the message together. Then, when both of the information is proved as being produced according to the predetermined after they are transformed into electronic data by means of a reading apparatus, it is determined that tampering has been made. For example, a background pattern (message authentication code) is selected from hash function values (i.e., the predetermined rule) of character data (message) of the document, and then, the characters and the background pattern are printed out in combination. That is, when a tampering person tampers with the characters themselves of the thus-obtained paper document, it may be difficult to also tamper with the background pattern in such a manner that both meet the predetermined rule relationship, since the background pattern may be provided throughout a wide range of the paper document, and, also, the background pattern according to the predetermined rule may not be created when the predetermined rule is not published. As a result, the tampering can be detected.

Further, 'shade detection' technology exists, as another method. According to this technology, as disclosed by Japanese Laid-open Patent Application No. 11-041450 (referred to as a patent document 2, hereinafter), the above-mentioned cutting and attaching tampering is detected from shade included in corresponding electronic image data. That is, irradiation light of a scanner is reflected in a direction other than that toward a sensor due to a step created in the periphery of the cut and attached tampered part. As a result, a dark shade occurs at this part. From such unnatural shade, the tampering is be detected.

SUMMARY OF THE INVENTION

However, according to the art disclosed by the patent document 1, a special reading apparatus (paper transmitting light utilization type) should be used, and thus, it may be problematic in terms of versatility. The digital watermarking technology can be applied only for a paper document, produced according to the predetermined special method. According to the above-mentioned art disclosed by the patent document 2, such tampering, which is made without producing any step providing a shade, i.e., tampering by means of correcting fluid or such, may not be detected.

The present invention has been devised in consideration of these situations, and an object of the present invention is to provide an image processing apparatus and an image processing method by which tampering can be detected even when a common paper document is read into electronic data by means of a common reading apparatus.

According to the present invention, an image processing apparatus detecting tampering made on a paper document, by carrying out image processing on grayscale image data optically read from the paper document, includes a part of amplifying a predetermined grayscale value of the grayscale image data, and also, reducing the other grayscale values; and an arithmetic part of detecting whether or not the paper document has been tampered with, according to grayscale converted data calculated based on first grayscale image data obtained from reading an obverse side of the paper document and second grayscale image data obtained from reading a reverse side of the paper document.

Thereby, tampering can be detected even when a common paper document is read into electronic data by means of a common reading apparatus.

Other objects and further features of the present invention will become more apparent from the following detailed description when read in conjunction with the accompanying drawings:

BRIEF DESCRIPTION OF THE DRAWINGS

FIG. 2 shows one example of an original image before being tampered with;

FIG. 3 shows one example of an image after being tampered with;

DETAILED DESCRIPTION OF THE PREFERRED EMBODIMENTS

Figure 1:
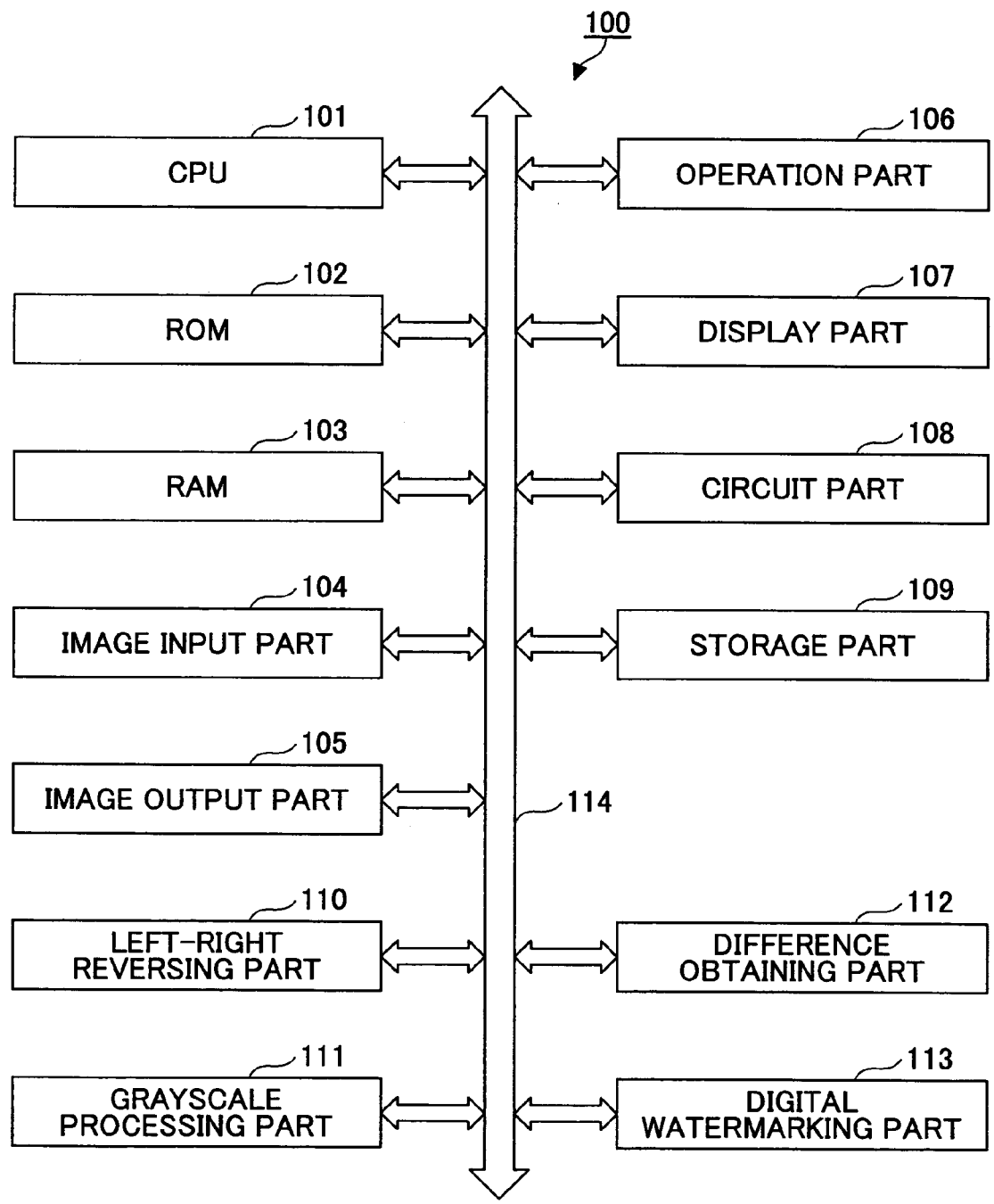
FIG. 1 shows a block diagram illustrating a configuration of an image processing apparatus according to one embodiment of the present invention.

According to the present invention, an image processing apparatus detecting tampering made on a paper document, by carrying out image processing on grayscale image data optically read from the paper document, includes a part of amplifying a predetermined grayscale value on the grayscale image data, and also, reducing the other grayscale values; and an arithmetic part of detecting whether or not the paper document has been tampered with, according to grayscale converted data calculated based on first grayscale image data obtained from reading an obverse side of the paper document and second grayscale image data obtained from reading a reverse side of the paper document.

Thereby, tampering can be detected even when a common paper document is read into electronic data by a common reading apparatus.

The arithmetic part may have an reversing part carrying out reversing processing on the first or the second grayscale image data; a difference obtaining part obtaining the difference between the thus-reversed first grayscale image data the second grayscale image data not reversed or between the thus-reversed second grayscale image data the first grayscale image data not reversed; and a determining part determining whether or not the paper document has been tampered with, based on the thus-obtained difference data.

Thereby, tampering can be efficiently detected.

Further, the arithmetic part may have an reversing part carrying out reversing processing on the first or the second grayscale image data; a digital watermarking part outputting digital watermarked image data based on the thus-reversed first grayscale image data and the second grayscale image data not reversed or the thus-reversed second grayscale image data and the first grayscale image data not reversed; and a determining part determining whether or not the paper document has been tampered with, based on the thus-obtained digital watermarked image data.

Thereby, image data can be easily managed, and also, tampering detection can be carried out in a secret situation.

According to another aspect of the present invention, an image processing method detecting tampering made on a paper document, by carrying out image processing on grayscale image data optically read from the paper document, has a step of amplifying a predetermined grayscale value of the grayscale image data, and also, reducing the other grayscale values; and an arithmetic step of detecting whether or not the paper document has been tampered with, according to grayscale converted data calculated based on first grayscale image data obtained from reading an obverse side of the paper document and second grayscale image data obtained from reading a reverse side of the paper document.

Thereby, tampering can be detected even when a common paper document is read into electronic data by means of a common reading apparatus.

Further, according to another aspect of the present invention, computer readable information recording medium stores a program having instructions for causing a computer to carry out the above-mentioned image processing method. Thereby, an image processing system carrying out the image processing method according to the present invention can be established in a versatile manner without changing an existing system.

Thus, by the present invention, since a reverse side image of an original read by a reading apparatus is made to undergo left-right reversing processing, then grayscale processing is carried out thereon, and thus, reverse side image is obtained. As a result, it is possible to achieve a detection of tampering even by a common reading apparatus. Further, according to the present invention, an image of a difference between the obverse side image and the reverse side image is obtained. As a result, tampering can be efficiently detected. Further, according to the present invention, an image is obtained in which a reverse side image is embedded in an obverse side image. Accordingly, management of images is easily carried out and also, detection of tampering can be achieved in a secret manner.

FIG. 1 shows a block diagram of a configuration of an image processing apparatus in one embodiment of the present invention. The image processing apparatus includes a CPU 101, a ROM 102 storing a control program which the CPU 101 executes and other data, a RAM 103 which is used as a work memory for expanding there an image processed, the program to execute, or such, an image input part 104 for obtaining image data from a paper document by means of a reading apparatus, an image output part 105 outputting an image obtained from the image input part 104 on a paper sheet, an OHP sheet, or such, an operation part 106 including switches, buttons, and so forth, a display part 107 such as an LED, an LCD, or such, a circuit part 108 carrying out transmission/reception of data with an external apparatus such as a PC via an Ethernet (registered trademark), a telephone line, wireless, or such, a detachable storage part 109 such as an IC card, a CD, a DVD, or such, a left-right reversing part 110 carrying out reversing between left and right of image data obtained from the paper document through the image input part 104, a grayscale processing part 111 carrying out grayscale processing, described later, on image data output from the left-right reversing part 110, a difference obtaining part 112 calculating a difference between image data of the paper document obtained through the image input part 104 and the image data having undergone the left-right reversing processing in the left-right reversing part 110 and having undergone the grayscale processing in the grayscale processing part 111 (as will be described later with reference to FIG. 12), and a digital watermarking part 113 carrying out processing of embedding the image data having undergone the left-right reversing processing in the left-right reversing part 110 and having undergone the grayscale processing in the grayscale processing part 111 into the image data obtained through the image input part 104 (as will be described later with reference to FIG. 13). It is noted that each part of the image processing part 100 is connected with each other by means of an internal bus 114. Further, in order to obtain both side image data of a paper document by means of the image input part 104, the reverse side image is read, after the obverse side image is read and then the paper document is reversed manually by hands. The present embodiment should not be limited to this manner. That is, a mechanism may be provided such that the paper document is automatically reversed, and both sides thereof is read at the same time.

Figure 4:
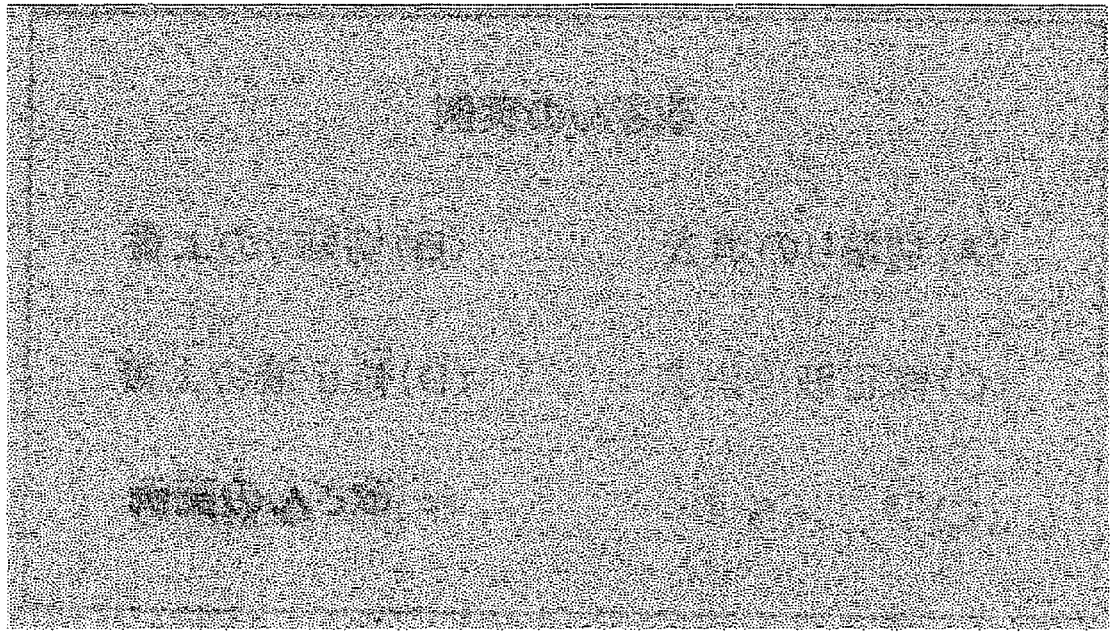
FIG. 4 shows image data obtained by a reading apparatus read from a reverse side of the tampered paper document.
Figure 5:
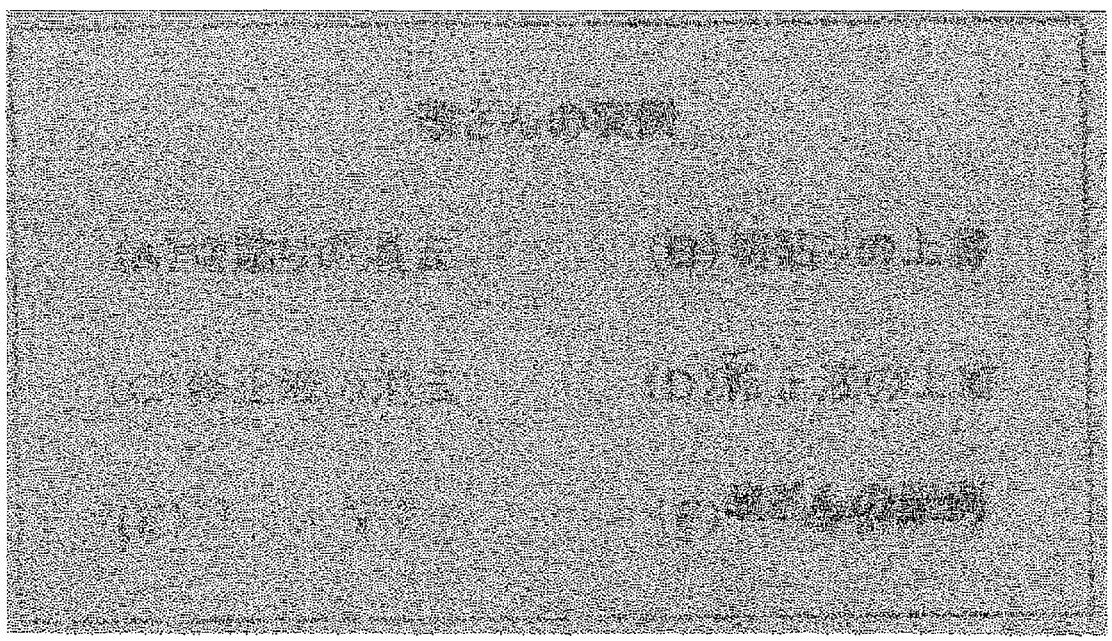
FIG. 5 shows an image obtained from left-right reversing the image shown in FIG. 4.

An actual example of tampered image data read from the tampered paper document, by means the reading apparatus, will now be shown. FIG. 2 shows one example of an image before being tampered with, and FIG. 3 shows one example of the image after being tampered with. In FIG. 3, a plurality of types of tampering are included. That is, in FIG. 3, the above-mentioned cutting and attaching tampering was made on (A) and (B) parts such that pieces of paper are attached to the characters of the (A) and (B) parts of FIG. 2. More specifically, on the (A) part of FIG. 3, a white paper piece was attached, while on the (B) part of FIG. 3, a paper piece, on which other characters "改ざんの実例" were printed, was attached. That is, simple erasing (the (A) part) and replacement (the (B) part) were made. For the (C) and (D) parts of FIG. 3, 'tampering with the use of correcting fluid' was made such that white correcting fluid was coated. For the (E) and (F) parts of FIG. 3, 'sand rubber eraser tampering' was made such that a sand rubber eraser is applied to erase the original characters. That is, after the original characters were erased by means of the correcting fluid or the sand rubber eraser, the paper document was once read by means of an image forming apparatus such as a copier, and after that, other characters "改ざんの実例" were printed in an overwriting manner on the (D) and (F) parts. That is, the parts (D) and (F) had undergone replacement tampering, while the (C) and (E) parts had undergone simple erasing tampering. The tampering can be detected easily when the paper document, on which the tampering was made, is directly observed. However, once the paper document is through a reading apparatus, detection of the tampering may become difficult from the thus-obtained image data (electronic data). Especially, detection of the tampering on the (E) and (F) parts is not possible if the original characters were completely erased. Also, detection of the tampering on the (B) and (D) parts is difficult if there occurs no error in the positions of the cut and attached paper pieces and the printing of new characters in the overwriting manner, with respect to the originally printed characters. Further, for the (A) part of FIG. 3, detection of the tampering is not possible if no shade occurs in the periphery of the cut and attached tampered part. Further, for the (C) part of FIG. 3, detection of the tampering is hardly possible. Thus, there may be many cases where tampering cannot be detected, only from image data obtained from a tampered paper document through a reading apparatus Next, FIG. 4 shows image data obtained from the reverse side of this tampered paper document through the reading apparatus. It is noted that, in this case, the reverse side of the paper document is blank. Actually, in many cases, documents are such that printing is made on both sides. In such a case, the both sides should be read by the reading apparatus accordingly. That is, to read both sides by the reading apparatus is not especially for the purpose of detecting tampering but is necessary operation for the paper document having both sides printed. FIG. 4 shows a state such that, although the reverse side of the paper document is thus blank, the characters printed on the obverse side can be observed. FIG. 5 shows an image obtained from carrying out reversing the document of FIG. 4 between left and right. From the (A), (B), (C) and (D) parts of the image shown in FIG. 5, the characters before being tampered can be read even obscurely. This is because, in any one of the corresponding above-mentioned two types of tampering, i.e., the cutting and attaching tampering and correcting fluid tampering, the original characters thus erased are still left behind the attached white paper pierces or the coated white correcting fluid. The embodiment of the present invention utilizes this phenomenon.

Figure 6:
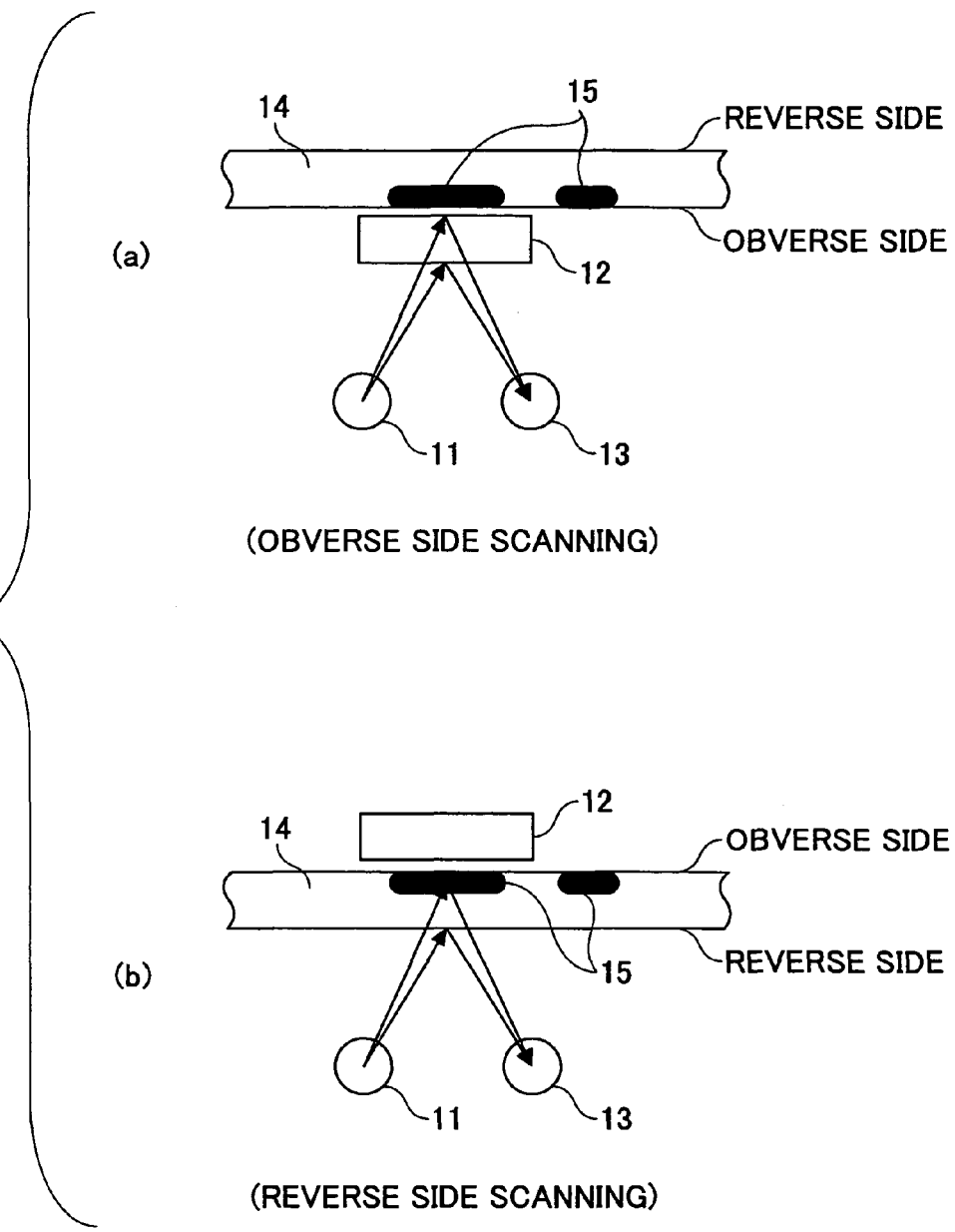
FIG. 6 shows a sectional diagrammatic view of a document having the cutting and attaching tampering made thereto and a mechanism of a reading apparatus.

Next, with reference to FIG. 6, a principle as to why the image, occurring before being tampered with, still appears on the reverse side of the paper document will be described. FIG. 6 shows a sectional typical view of the above-mentioned document tampered in the cutting and attaching manner corresponding to the above-mentioned (A) part and a mechanism of the reading apparatus, viewed from a horizontal direction. FIG. 6 (*a*) shows a state in which the obverse side of the tampered paper document, on which ink 15 is placed, is scanned, while FIG. 6(*b*) shows a state in which the reverse side of the tampered paper document is scanned. As shown in FIG. 6(*a*), light emitted by a light source 11 of the reading apparatus is reflected by the obverse side and the reverse side of the cut and attached paper piece 12, and then, the reflected light is received by a light sensor 13. However, light reflected by the obverse side of the paper document 14 attenuates much since it is blocked by the cut and attached paper piece 12 itself, and thus, hardly reaches the light sensor 13. Since only light reflected from the obverse side of the paper document 14 has thus substantial information as to whether or not the ink 15 exists on the obverse side of the paper document 14, the thus-obtained image of the obverse side of the paper document 14 hardly includes an image, occurring only before being tampered with. On the other hand, as shown in FIG. 6(*b*), light emitted by the light source 11 is reflected by the reverse side and the obverse side of the paper document 14, and the reflected light is received by the light sensor 13. The reflected light amount obtained from the obverse side of the paper document 14 also has information as to whether or not the ink 15 exists on the obverse side of the paper document 14. As a result, an image of the reverse side includes an image, occurring only before being tampered with.

Figure 7:
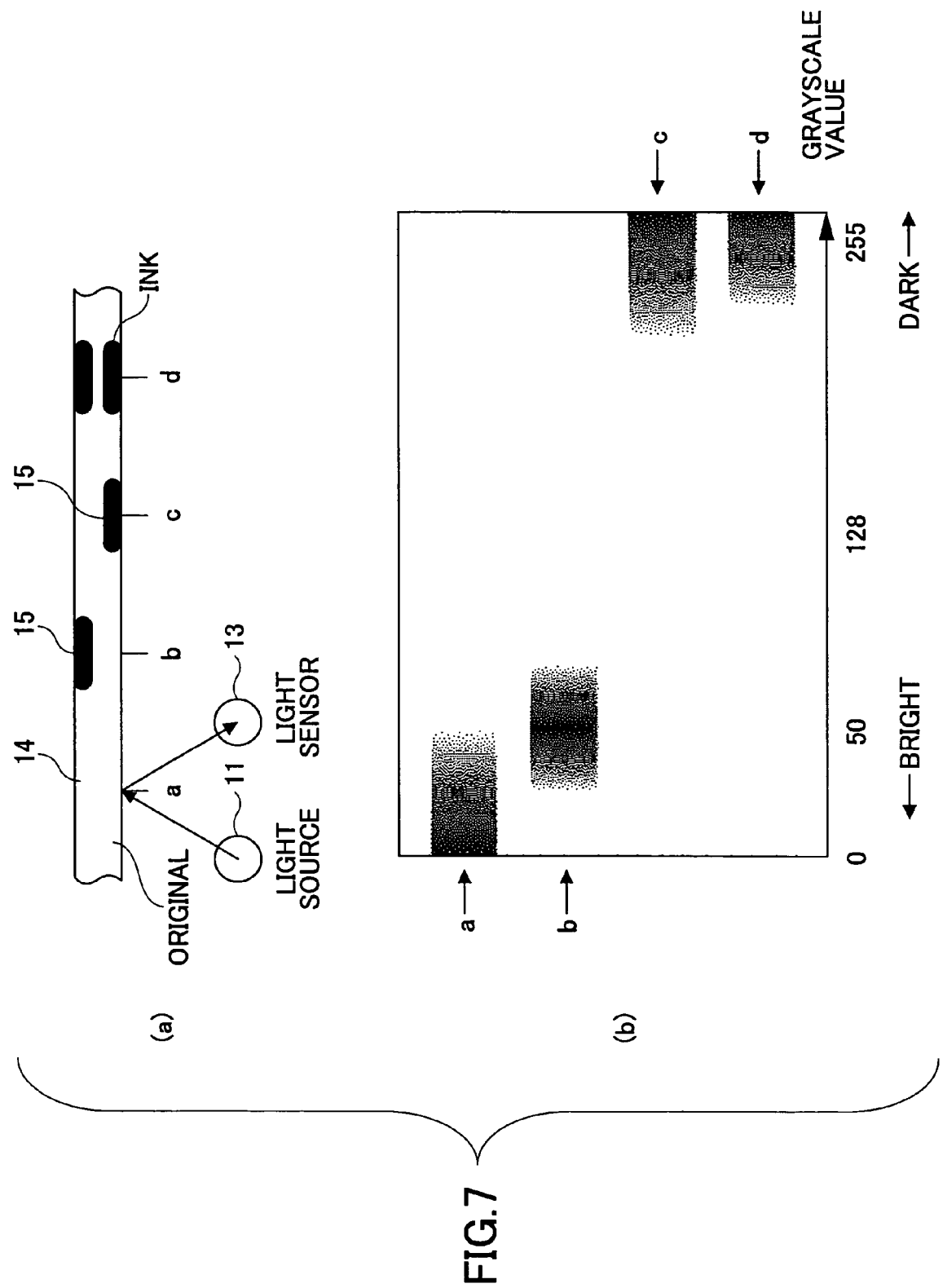
FIG. 7 shows an experiment for a grayscale value distribution of an image for ink from a reverse side and an obverse side of a paper document.

The inventor made an experiment for a distribution of grayscale values of image data of a paper document under four different conditions as to whether or not ink exists on the reverse side or the obverse side of the paper document 14. FIG. 7 shows a result thereof. In the experiment shown, it was aimed to extract parts at which the ink exists on the obverse side, i.e., a part 'b' and a part 'd' by reading the paper document 14 by the reading apparatus from the reverse side of the paper document 14. As to the part 'd', it is not possible to separately extract data since the distribution of grayscale values thereof almost corresponds to that of the part 'c'. However, as to the part 'b', while the distribution of grayscale values somewhat corresponds to that of the part 'a', it is possible to generally extract it. In an actual paper document, there is little possibility that no part corresponding to the part 'b' exists while only parts corresponding to the part 'd' exist. Accordingly, by extracting only parts corresponding to the part 'b', an image occurring only before being tampered with can be extracted although in such a manner that the image may be extracted fragmentarily due to existence of parts corresponding to the part 'd'. Thus, there should be no problem for putting this method into a practical use. The distribution of the part 'b' had a specific grayscale value around 50 in 8-bit grayscale image data (i.e., bright 0 through dark 255). Accordingly, when pixels having grayscale values near this value can be extracted, an image occurring only before being tampered with should appear in image data obtained from reading, from the reverse side of the paper document.

Figure 8:
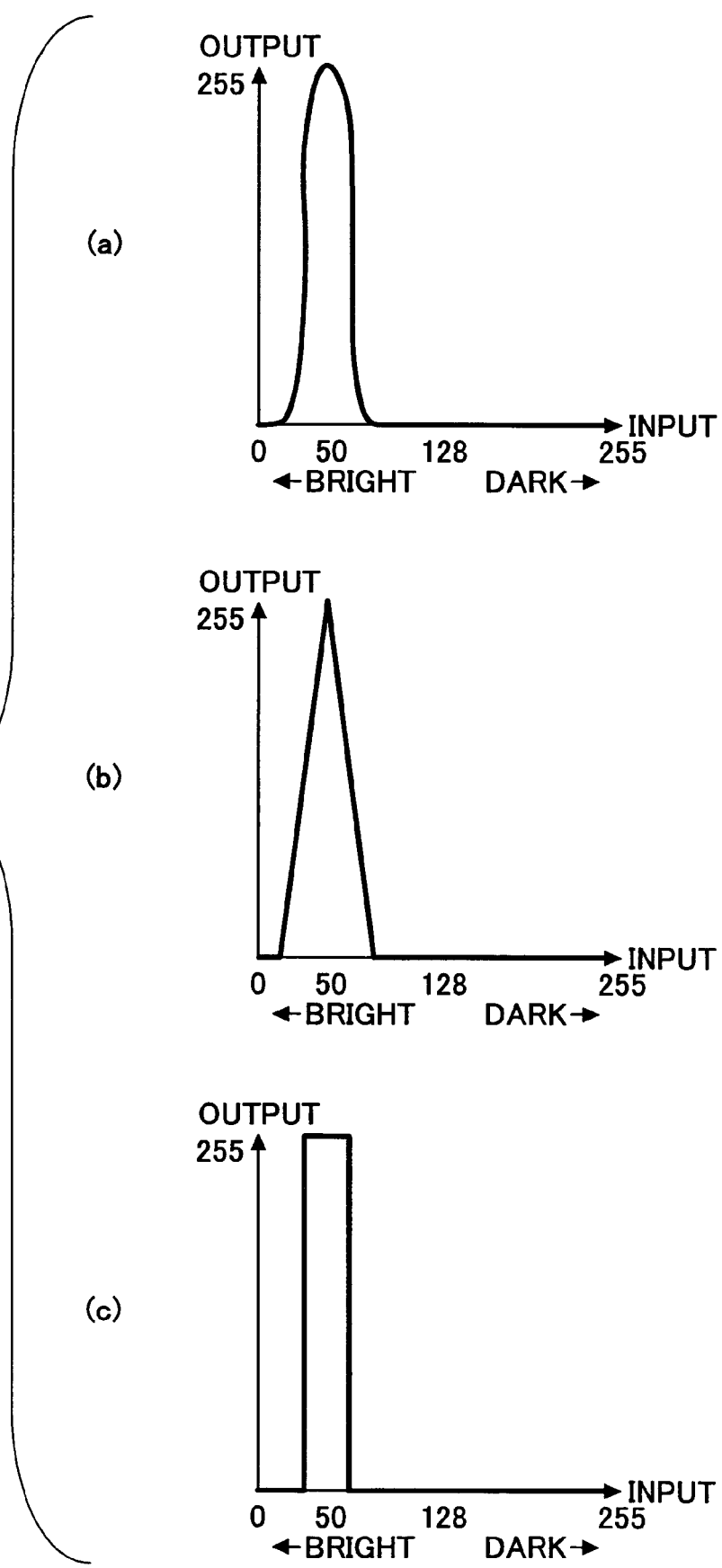
FIG. 8 shows a characteristic diagram showing one example of characteristics of grayscale converting processing.

For this purpose, according to the embodiment of the present invention, this extraction is carried out by means of the above-mentioned grayscale processing part 111 of FIG. 1. FIG. 8 shows characteristic curves of the grayscale processing, as alternative examples thereof. In each of FIGS. 8(*a*), (*b*) and (*c*), the abscissa denotes an input value while the ordinate denotes an output value, and shows a grayscale value, which each grayscale value is converted into. According to the embodiment of the present invention, grayscale values around 50 are amplified into on the order of 255, while the other grayscale values are reduced into 0, as shown in each of FIGS. 8(*a*), (*b*) and (*c*).

Figure 9:
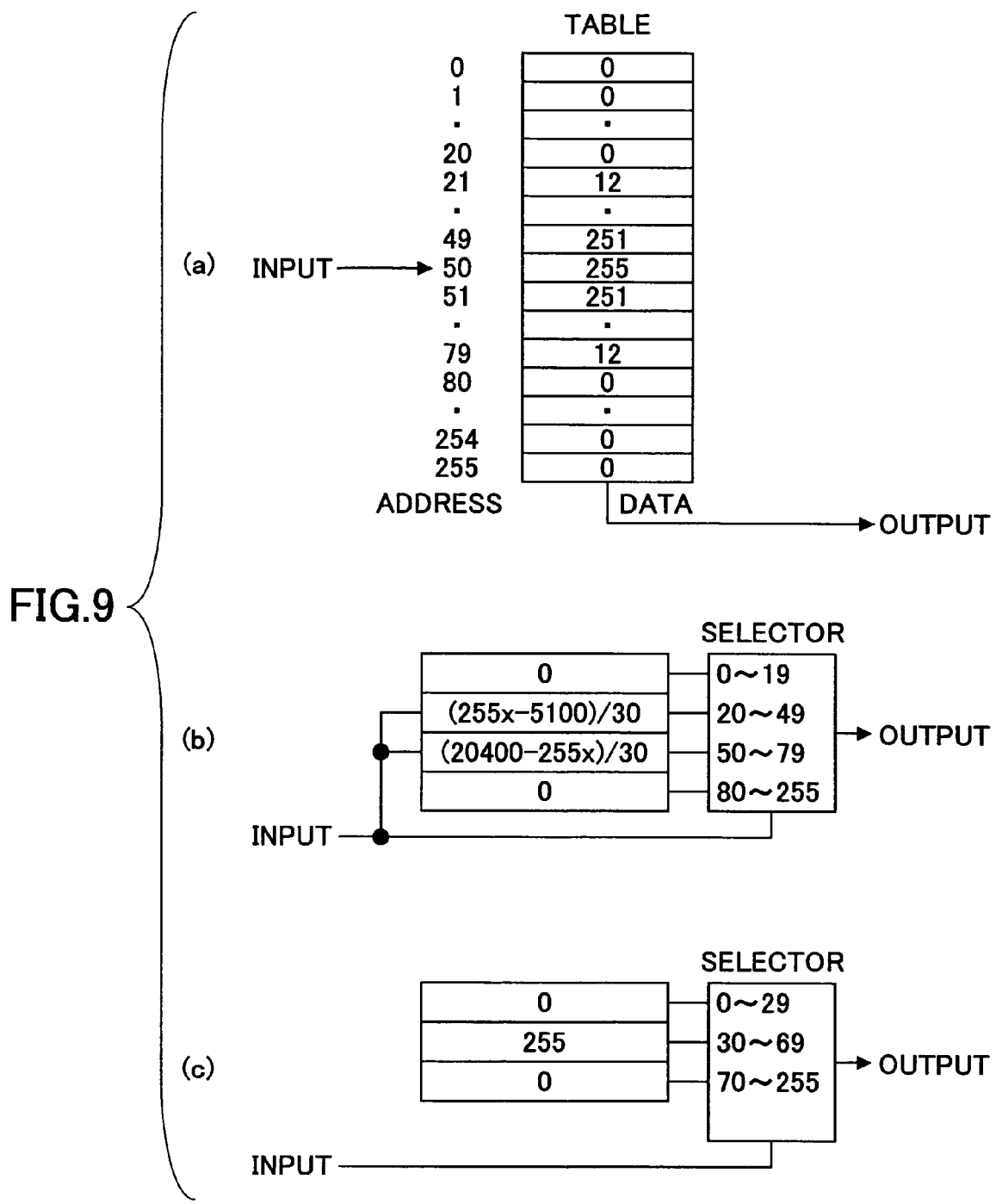
FIG. 9 shows alternative examples of a configuration of the grayscale processing part in the image processing apparatus according to the embodiment of the present invention.
Figure 10:
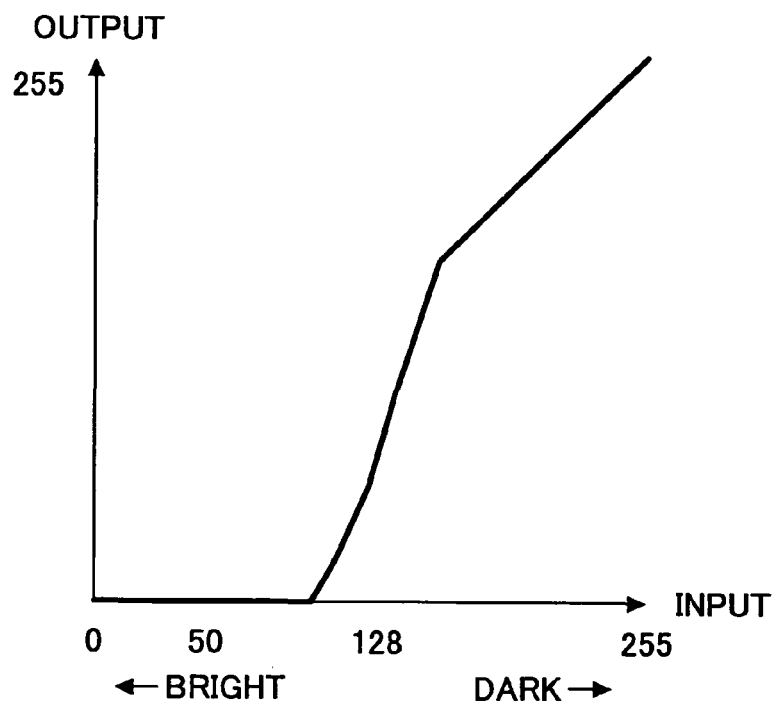
FIG. 10 shows a characteristic diagram illustrating a state in which a grayscale value reduces from input to output.

FIG. 9 shows an example of a configuration of the grayscale processing part 111 in the image processing apparatus in the embodiment of the present invention. The grayscale processing part 111 shown in FIG. 9(*a*) carries out table converting processing such as to regard an input grayscale value as an address, and output data stored at the address of a predetermined table as an output grayscale value. Each of the grayscale processing part of FIGS. 9(*b*) and (*c*) has a selector to change connection according to a section of a plurality of sections, to which an input grayscale value belongs, as well as predetermined function converting circuits providing respective predetermined functions for conversion. In the example of FIG. 9(*b*), when the input value belongs to 0 through 19, the selector connects the top line to the output. The top line is fixed to the value 0. When the input value belongs to 20 through 49, the selector connects the second line to the output. The second line outputs a value of the corresponding predetermined function converting circuit. In this case, the predetermined function converting circuit provides a predetermined function of $Y=(255 \times X-5100)/30$, and thus, converts the input value X into the output value Y. When the input value X is 30 for example, the output value Y becomes 85 accordingly. FIG. 8(*a*) and FIG. 9(*a*) correspond to conversion based on the distribution shown in FIG. 7(*b*), and provide ideal conversion. However, the converting processing is complicate. In contrast thereto, the converting processing of FIG. 8(*b*), (*c*) and FIG. 9(*b*), (*c*) is rather simple. The grayscale processing according to the embodiment of the present invention is different from that used in so-called 'reverse appearing removal'. 'Reverse appearing' phenomenon is a phenomenon such that an image printed on a obverse side of a paper document also appears on a reverse side as a result of the obverse side printed image passing through the paper material to the reverse side. 'Reverse appearing removal' is processing to remove influence of such a reverse appearing printed image when a both side printed original is read by a reading apparatus. In the reverse appearing removal processing, as shown in FIG. 10, merely grayscale values are reduced for a predetermined range. Such a manner is different from the manner according to the embodiment of the present invention in which grayscale values in a middle range is amplified, while those in the both sides are reduced, as shown in FIG. 8.

Figure 11:
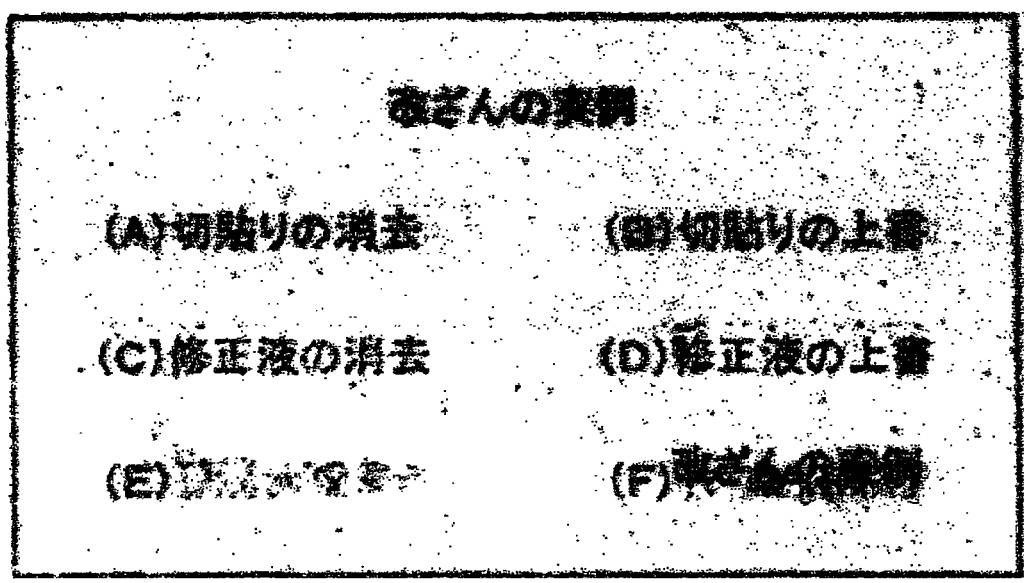
FIG. 11 shows a result of the grayscale processing of FIG. 8(a) being carried out on the image data of FIG. 5.

FIG. 11 shows a result of the grayscale processing of FIG. 8(*a*) being carried out on the image data of FIG. 5. In comparison to the obverse side image shown in FIG. 3, the tampering can be easily detected even from the electronic data. However, three problems may be involved in this method of detecting tampering from the difference between the obverse side image of FIG. 3 and the reverse side image of FIG. 11. The first problem is that, to find a deference between the two images may be troublesome. The second problem is that, the two images created from the single original should be stored in such a manner that both images may be kept in a set, i.e., to prevent both images from scattering. The third problem is that, since the special image (i.e., the image of FIG. 11 for example) should be output from the reading apparatus in addition to the ordinary image (i.e., the image of FIG. 3), it is obvious for a user that the reading apparatus has the tampering detection function. This third problem is problematic for a case where a tampering person who carries out tampering and reading operation can recognize this fact. This tampering person can avoid using such a reading apparatus having the tampering detection function and can use another reading apparatus not having such a function so as to prevent the tampering from being detected. Image processing according to the embodiment of the present invention for solving these problems will now be described.

Figure 12:
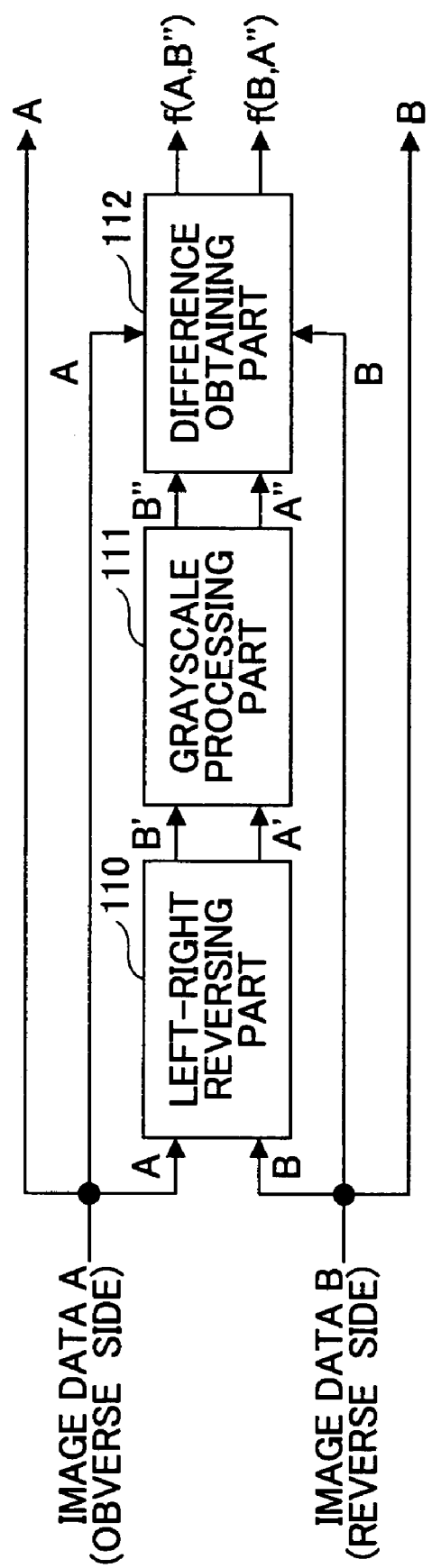
FIG. 12 shows a block diagram illustrating a general configuration of image processing in the image processing apparatus according to the embodiment of the present invention.

FIG. 12 shows a block diagram illustrating a general configuration of image processing of the image processing apparatus according to the embodiment of the present invention. In FIG. 12, first, the left-right reversing part 110 carries out left-right reversing processing on image data A obtained from reading an obverse side of a paper document. Further, the thus-obtained left-right reversed image data A' undergoes grayscale processing carried out by the grayscale processing part 111. The thus-obtained grayscale processed image data A" is then provided to the difference obtaining part 112. On the other hand, image data B obtained from reading a reverse side of the same paper document undergoes left-right reversing processing by the left-right reversing part 110. Further, the thus-obtained left-right reversed image data B' then undergoes grayscale processing carried out by the grayscale processing part 111. The thus-obtained grayscale processed image data B" is then provided to the difference obtaining part 112. After that, first, the difference obtaining part 112 calculates the difference between the image data A of the obverse side of the paper document and the grayscale processed image data B" (of the reverse side image data), and outputs a calculation result as a difference image data f(A, B"). Similarly, the difference obtaining part 112 calculates the difference between the image data B of the reverse side of the paper document and the grayscale processed image data A" (of the obverse side image), and outputs a calculation result as another difference image data f(B, A"). That is, in the image processing apparatus according to the embodiment of the present invention, image processing of obtaining the difference between the image data of one side of a given original and the image data obtained from carrying out, on the image data of the other side of the given original, left-right reversing processing and grayscale processing, is carried out for each of both of the obverse side and the reverse side of the given original. Then, parts of the thus-obtained difference image data, which parts have pixel value of 'not zero', that is, the difference parts between the obverse side image of FIG. 3 and the reverse side image of FIG. 11 for example, represent a doubt for tampering. In this method, tampering detection can be carried out, from the single difference image, i.e., any one of f(A, B") for the obverse side or f(B, A") for the reverse side, and thus, the above-mentioned first problem is solved. The tampering detection may be carried out by human eyes in visual observation of the difference image f(A, B") or f(B, A"), or, may be carried out automatically. When the tampering detection is carried out automatically, the first problem can be solved further efficiently. As one example of the automatic tampering determination, absolute values of pixel values of the difference image data are summed for a predetermined small area, and, a determination is made as to whether or not the thus-obtained summed value exceeds a predetermined threshold. For example, the difference image data is divided into block units each having an area of 1 cm by 1 cm, the absolute values of all the pixel values included in each of the block unit are summed. Then, when the thus-obtained summed value exceeds the predetermined threshold, it is determined that tampering was made for the corresponding block. However, in this method, problems of 'error' and 'noise' may be involved. That is, in this method, the obverse side image data and the reverse side image data are obtained as a result of a single reading apparatus being operated twice correspondingly. In this case, it may not be possible to carry out these two reading operations in the completely same conditions, i.e., to keep, with high precision, the positional relationship between the reading mechanism and the original, operation condition of the reading apparatus, and so forth. As a result, slight 'error' may occur between the two image data with respect to the horizontal/vertical positions, angles, magnifications, or such. Further, for the reverse side image, since a dynamic range is narrow as shown in FIG. 7(b), many noises may be included. The difference image data may be influenced by the 'error' and/or 'noise', and thus, may have difference values of 'not zero' even for parts which were not actually tampered with. However, these problems can be solved by appropriately carrying out position adjusting processing, noise removal filtering processing, and so forth, together.

Figure 13:
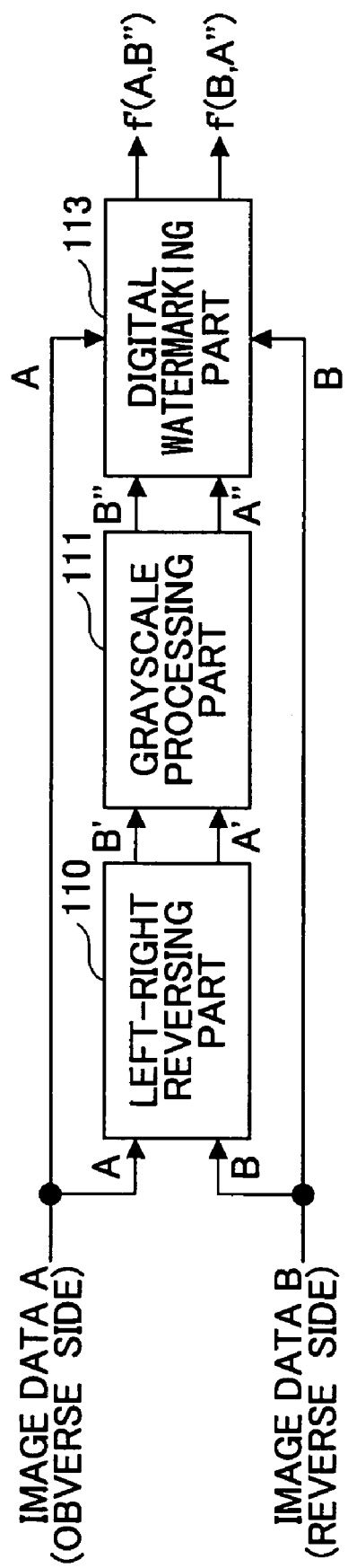
FIG. 13 shows a block diagram illustrating a general configuration of other image processing in the image processing apparatus according to the embodiment of the present invention.
Figure 14:
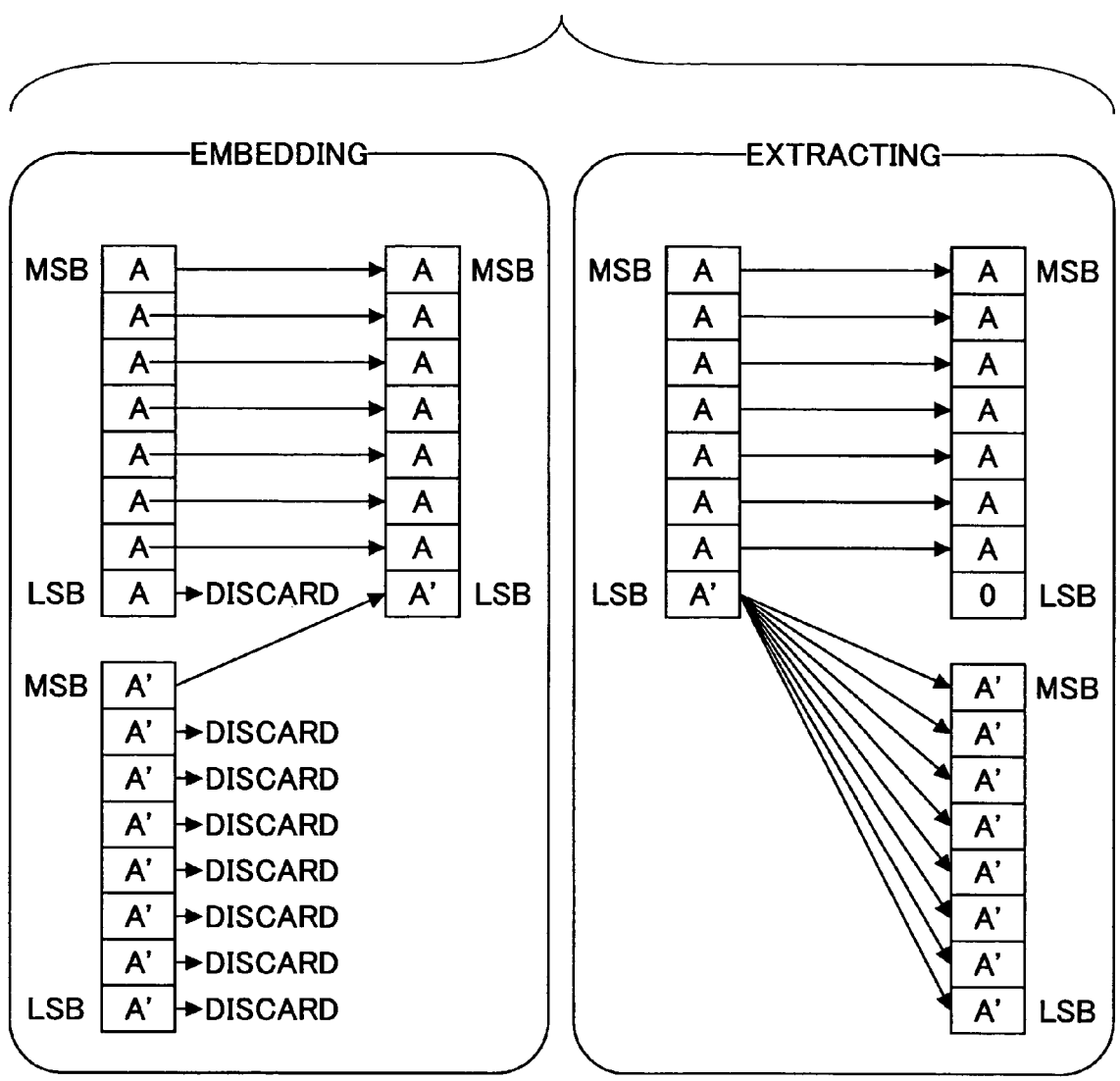
FIG. 14 shows one example of digital watermarking processing.

FIG. 13 shows a block diagram illustrating a general configuration of other image processing in the image processing apparatus in the embodiment of the present invention. In FIG. 13, first, the left-right reversing part 110 carries out left-right reversing processing on image data A obtained from reading an obverse side of a paper document. Further, the thus-obtained left-right reversed image data A' undergoes grayscale processing carried out by the grayscale processing part 111. The thus-obtained grayscale processed image data A" is then provided to the digital watermarking part 113. On the other hand, image data B obtained from reading a reverse side of the same paper document undergoes left-right reversing processing by the left-right reversing part 110. Further, the thus-obtained left-right reversed image data B' undergoes grayscale processing carried out by the grayscale processing part 111. The thus-obtained grayscale processed image data B" is then provided to the digital watermarking part 113. After that, first, the digital watermarking part 113 carries out digital watermarking processing, i.e., embedding the grayscale processed image data B" (of the reverse side image) into the obverse side image data A of the paper document, and outputs the thus-obtained image data as digital watermarked image data f'(A, B"). Similarly, the digital watermarking part 113 carries out digital watermarking processing, i.e., embedding the grayscale processed image data A" (of the obverse side image data) into the reversed image data B of the paper document, and outputs the thus-obtained image data as digital watermarked image data f'(B, A"). That is, in the image processing apparatus according to the embodiment of the present invention, image processing of embedding, into the image data of one side of a given original, the image data obtained from carrying out, on the image data of the other side of the given original, left-right reversing processing and grayscale processing, is carried out for each of both of the obverse side and the reverse side of the given original. In this method, the single image data, i.e., f'(A, B") for the obverse side image or f'(B, A") for the reverse sided image, is obtained from the two image data through the digital watermarking. As a result, the above-mentioned second and third problems are solved. That is, digital watermarking processing is processing such that, in such a manner that image quality of image data (obverse side image, for example) is maintained, other image data (reverse side image) is embedded thereinto. For example, in digital watermarking processing, only the least significant bit (LSB) of the obverse side image data in 8 bit grayscale image data is replaced by the reverse side image data, and thus, an embedded image is obtained. FIG. 14 illustrates this example of digital watermarking processing. The thus obtained embedded image seems almost the same as the original image in appearance, since all the image data of the original image of the obverse side image, other than the least significant bit (LSB), is left unchanged as mentioned above. In this embedded image, binarized information of the reverse side image is included as the LSB as mentioned above. Accordingly, as shown in FIG. 14, right side, it is possible to separate the embedded image data into the two images by extracting the least significant bit (LSB) of the embedded image data. Then, by comparing between these two image data, it is possible to determine that a doubt for tampering occurs in parts including differences between the two image data. In this method, the reading apparatus outputs only the embedded image data, which seems almost the same as the original image data as mentioned above, as if the reading apparatus is a common one having no tampering detection function. Accordingly, it is possible to conceal that the reading apparatus has the tampering detection function. Thus, the above-mentioned third problem is solved.

Embodiments of the present invention are not limited to those described above. For example, the digital watermarking processing may be such that, embedding is carried out in, instead of a real space, but in a frequency space, and/or, such that a resistance to lossy compression is provided. Processing may be carried out such that a time stamp is added to image data generated by the reading apparatus according to the embodiment of the present invention.

Figure 15:
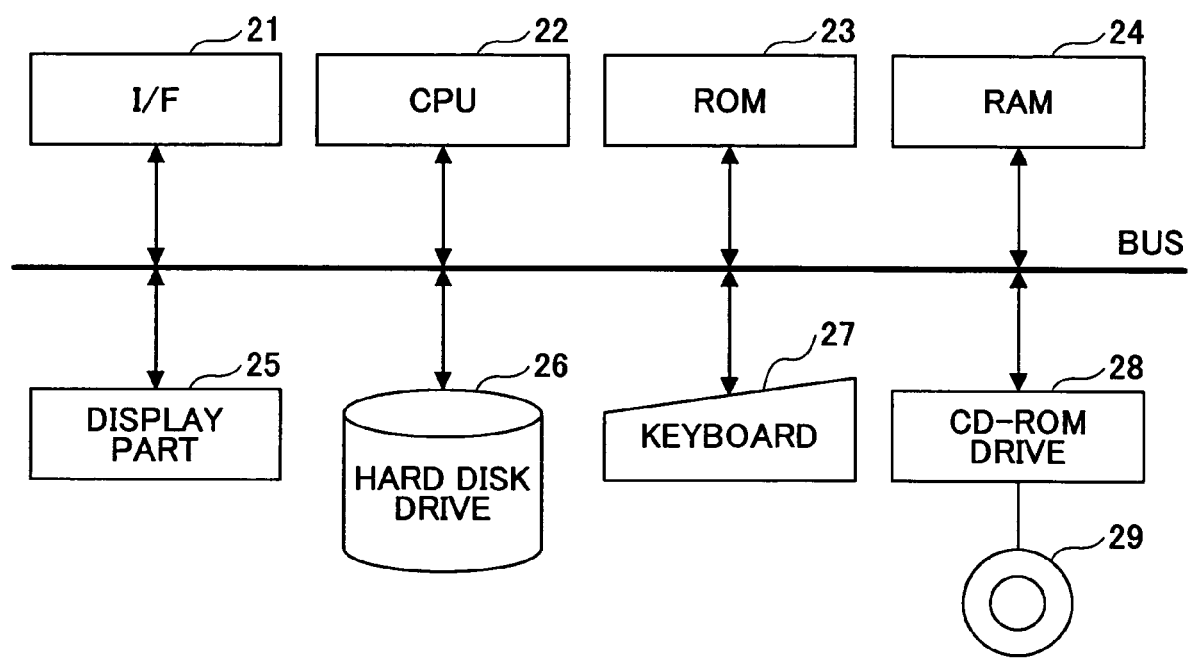
FIG. 15 shows a block diagram of a specific apparatus for starting up a program for causing a computer to execute an image processing method according to the embodiment of the present invention.

FIG. 15 shows a block diagram illustrating a configuration of a specific apparatus for starting up a program for causing a computer to execute the above-described image processing method according to the embodiment of the present invention, which the image processing apparatus according to the embodiment of the present invention described above carries out. That is, FIG. 15 shows hardware built of a microprocessor and so forth for executing software according to the image processing method of the embodiment of the present invention. In FIG. 15, an image processing system includes an interface (abbreviated as I/F, hereinafter) 21, a CPU 22, a ROM 23, a RAM 24, a display device 25, a hard disk drive 26, a keyboard 27 and a CD-ROM drive 28. This system may be made of a general-purpose processing unit, while the program for causing the computer to execute the image processing method according to the embodiment of the present invention is stored in the computer readable information recording medium 29 such as a CD-ROM. Via the I/F 21, a control signal is input from an external apparatus, and thus, the program according to the embodiment of the present invention is started up by an operator's instructions input through the keyboard 27, or automatically. The CPU 22 carries out image processing according to the image processing method of the embodiment of the present invention according to the program, stores the processing results in the storage device such as the RAM 24 or the hard disk drive 28, or outputs the same, as is necessary, on the display device 25. Thus, the program for executing the image processing method according to the embodiment of the present invention builds the image processing system with the use of the information recording medium without changing the existing system in a universal manner.

Further, the present invention is not limited to the above-described embodiments, and variations and modifications may be made without departing from the basic concept of the present invention claimed below.

The present application is based on Japanese Priority Application Nos. 2005-279277 and 2006-200161, filed on Sep. 27, 2005 and Jul. 24, 2006, respectively, the entire contents of which are hereby incorporated herein by reference.

What is claimed is:

1. An image processing apparatus detecting tampering made on a paper document, by carrying out image processing on grayscale image data optically read from the paper document, comprising:
   a part of amplifying a predetermined first grayscale value of the grayscale image data, and also, reducing at least a second grayscale value; and
   an arithmetic part of detecting whether or not the paper document has been tampered with, according to grayscale converted data calculated based on a comparison of first grayscale image data obtained from reading an obverse side of the paper document and second grayscale image data obtained from reading a reverse side of the paper document.

2. The image processing apparatus as claimed in claim 1, wherein:
   said arithmetic part comprises a reversing part carrying out reversing processing on the first or the second grayscale image data; a difference obtaining part obtaining the difference between the thus-reversed first grayscale image data and the second grayscale image data not reversed or between the thus-reversed second grayscale image data and the first grayscale image data not reversed; and a determining part determining whether or not the paper document has been tampered with, based on the thus-obtained difference data.

3. The image processing apparatus as claimed in claim 1, wherein:
   said arithmetic part comprises a reversing part carrying out reversing processing on the first or the second grayscale image data; a digital watermarking part outputting digital watermarked image data based on the thus-reversed first-grayscale image data and the second grayscale image data not reversed or the thus-reversed second grayscale image data and the first grayscale image data not reversed; and a determining part determining whether or not the paper document has been tampered with, based on the thus-obtained digital watermarked image data.

4. The image processing apparatus as claimed in claim 1, wherein:
   the first grayscale value is a grayscale value of a marking scanned from a reverse side of a document, where the marking appears on only an obverse side of the document.

5. The image processing apparatus as claimed in claim 1, wherein:
   the first grayscale value is approximately 50 in 8-bit grayscale image data where bright is 0 and dark is 255.

6. The image processing apparatus as claimed in claim 1, wherein:
   said arithmetic part comprises a location detection part that determines the location of tampering on the paper document by dividing the first and second grayscale image data into a plurality of block units, summing the values of the difference in the first grayscale image data and the second grayscale image data for each of a plurality of pixel values in each block unit, and comparing the summed values against a predetermined threshold.

7. The image processing apparatus as claimed in claim 1, further comprising:
   a display for displaying the grayscale converted data calculated based on the comparison of the first and second grayscale image data.

8. An image processing method detecting tampering made on a paper document, by carrying out image processing on grayscale image data optically read from the paper document, comprising:
   a step of amplifying a predetermined first grayscale value of the grayscale image data, and also, reducing at least a second grayscale value; and
   an arithmetic step of detecting whether or not the paper document has been tampered with, according to grayscale converted data calculated based on a comparison of first grayscale image data obtained from reading an obverse side of the paper document and second grayscale image data obtained from reading a reverse side of the paper document.

9. The image processing method as claimed in claim 8, wherein:
   said arithmetic step comprises a reversing step of carrying out reversing processing on the first or second grayscale image data; a difference obtaining step of obtaining the difference between the thus-reversed first grayscale image data and the second grayscale image data not reversed or between the thus-reversed second grayscale image data and the first grayscale image data not reversed; and a determining step of determining whether or not the paper document has been tampered with, based on the thus-obtained difference data.

10. The image processing method as claimed in claim 8, wherein:
    said arithmetic step comprises a reversing step of carrying out reversing processing on the first or second grayscale image data; a digital watermarking step of outputting digital watermarked image data based on the thus-reversed first grayscale image data and the second grayscale image data not reversed or the thus-reversed second grayscale image data and the first grayscale image data not reversed; and a determining step of determining whether or not the paper document has been tampered with, based on the thus-obtained digital watermarked image data.

11. The image processing method as claimed in claim 8, wherein:
    the first grayscale value is a grayscale value of a marking scanned from a reverse side of the paper document, where the marking appears on only an obverse side of the paper document.

12. The image processing method as claimed in claim 8, wherein:
    the first grayscale value is approximately 50 in 8-bit grayscale image data where bright is 0 and dark is 255.

13. The image processing method as claimed in claim 8, wherein:
said arithmetic step comprises a location detection step that determines the location of tampering on the paper document by dividing the image data into a plurality of block units, summing values of a difference in the first grayscale image data and the second grayscale image data for each of a plurality of pixels in each block unit, and comparing the summed values against a predetermined threshold.

14. The image processing method as claimed in claim 8, further comprising:
a display for displaying the grayscale converted data calculated based on the comparison of the first and second grayscale image data.

15. The image processing method as claimed in claim 8, wherein:
said first grayscale value is a grayscale value of a marking that is scanned from a reverse side of the paper document, where the marking appears on only an obverse side of the paper document, and wherein
said reducing at least a second grayscale value comprises reducing all values other than those corresponding to the first grayscale value, and wherein
said arithmetic step comprises
a reversing step of carrying out reversing processing on the first grayscale image data or the second grayscale image data;
a difference obtaining step of obtaining the difference between the thus-reversed first grayscale image data and the second grayscale image data not reversed or between the thus-reversed second grayscale image data and the first grayscale image data not reversed for each pixel of the image data; and
a determining part determining the location at which the paper document has been tampered with by dividing the first and second grayscale image data into a plurality of block units, summing the values of difference in the first grayscale image data and the second grayscale image data for each of a plurality of pixel values in each block unit, and identifying block units for which the values exceed a predetermined threshold.

16. A computer readable recording medium having a computer program embedded thereon, the computer program having instructions for causing a computer to carry out:
a step of amplifying a predetermined first grayscale value of grayscale image data optically read from a paper document, and also, reducing at least a second grayscale value; and
an arithmetic step of detecting whether or not the paper document has been tampered with, according a comparison of first grayscale image data obtained from reading an obverse side of the paper document and second grayscale image data obtained from reading a reverse side of the paper document.

17. The computer readable recording medium as claimed in claim 16, wherein:
said arithmetic step comprises a reversing step of carrying out reversing processing on the first or second grayscale image data; a difference obtaining step of obtaining the difference between the thus-reversed first grayscale image data and the second grayscale image data not reversed or between the thus-reversed second grayscale image data and the first grayscale image data not reversed; and a determining step of determining whether or not the paper document has been tampered with, based on the thus-obtained difference data.

18. The computer readable recording medium as claimed in claim 16, wherein:
said arithmetic step comprises
a reversing step of carrying out reversing processing on the first or second grayscale image data;
performing said step of amplifying on the first or second grayscale image data reversed in the reversing step;
a digital watermarking step of outputting digital watermarked image data that embeds the thus-reversed and amplified first grayscale image data into the unamplified second grayscale image data not reversed or embeds the thus-reversed and amplified second grayscale image data in the unamplified first grayscale image data not reversed; and
a determining step of determining whether or not the paper document has been tampered with, based on the thus-obtained digital watermarked image data.

19. The computer readable recording medium as claimed in claim 16, wherein:
the first grayscale value is a grayscale value of a marking scanned from a reverse side of the paper document, where the marking appears on only an obverse side of the paper document.

20. The computer readable recording medium as claimed in claim 16, wherein:
said arithmetic step comprises a location detection step that determines the location of tampering on the paper document by dividing the image data into a plurality of block units, summing values of a difference in the first grayscale image data and the second grayscale image data for each of a plurality of pixels in each block unit, and comparing the summed values against a predetermined threshold.

* * * * *